US009427832B2

(12) United States Patent
Akimoto et al.

(10) Patent No.: US 9,427,832 B2
(45) Date of Patent: Aug. 30, 2016

(54) PROCESSING METHOD AND BEARING

(75) Inventors: Shogo Akimoto, Iwata (JP); Taku Nishiki, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 13/503,878

(22) PCT Filed: Nov. 19, 2010

(86) PCT No.: PCT/JP2010/070690
§ 371 (c)(1),
(2), (4) Date: Apr. 25, 2012

(87) PCT Pub. No.: WO2011/068041
PCT Pub. Date: Jun. 9, 2011

(65) Prior Publication Data
US 2012/0269476 A1    Oct. 25, 2012

(30) Foreign Application Priority Data

Dec. 2, 2009 (JP) .................................. 2009-274360

(51) Int. Cl.
*B23P 13/04* (2006.01)
*B21D 53/10* (2006.01)
(Continued)

(52) U.S. Cl.
CPC .............. *B23P 15/003* (2013.01); *B23P 13/02* (2013.01); *B24B 1/00* (2013.01); *B24B 19/06* (2013.01); *F16C 33/64* (2013.01); *B23B 2226/125* (2013.01); *B23B 2228/24* (2013.01); *F16C 19/364* (2013.01); *Y10T 29/49636* (2015.01);
(Continued)

(58) Field of Classification Search
CPC ...... B21D 28/00; B21D 51/24; B21D 53/10; B21D 53/12; B23P 13/04; B23P 13/00; B21K 1/04; B21K 1/05; B21K 1/76; Y10T 29/49636; Y10T 29/49679; Y10T 29/49707; Y10T 29/49689
USPC ...................... 29/898.048, 898.054, 898.056, 29/898.063, 898.13, 898.068, 557, 558, 29/898, 898.01; 72/340
See application file for complete search history.

(56) References Cited

U.S. PATENT DOCUMENTS 3,641,716 A *  2/1972  Price ............................. 451/415
3,803,890 A *  4/1974  Connell .................... B21H 1/12
                                                        29/898.066
(Continued)

FOREIGN PATENT DOCUMENTS

JP          2-299902         12/1990
JP          06-246546         9/1994
(Continued)

OTHER PUBLICATIONS

Translation of WO 2005124174, Machine Translation.*
(Continued)

*Primary Examiner* — David Bryant
*Assistant Examiner* — Darrell C Ford
(74) *Attorney, Agent, or Firm* — Wenderoth, Lind & Ponack, L.L.P.

(57) ABSTRACT

A processing method for a bearing is capable of shortening a lead time without the need for carrying out super finishing (mirror grinding). A component of a bearing is finished while chucking the component by a chucking device. Hardened steel cutting and grinding are carried out while chucking the component without releasing the chucking by the chucking device.

2 Claims, 5 Drawing Sheets

(51) Int. Cl.
  *B23P 17/00* (2006.01)
  *B21D 53/00* (2006.01)
  *B23P 15/00* (2006.01)
  *B23P 13/02* (2006.01)
  *B24B 1/00* (2006.01)
  *B24B 19/06* (2006.01)
  *F16C 33/64* (2006.01)
  *F16C 19/36* (2006.01)

(52) U.S. Cl.
  CPC ..... *Y10T 29/49679* (2015.01); *Y10T 29/49689* (2015.01); *Y10T 29/49707* (2015.01)

(56) References Cited

U.S. PATENT DOCUMENTS

| | | | |
|---|---|---|---|
| 3,879,897 A * | 4/1975 | Kato | 451/52 |
| 3,972,148 A * | 8/1976 | Beauchet et al. | 451/72 |
| 4,393,563 A * | 7/1983 | Smith | 419/28 |
| 4,592,172 A * | 6/1986 | Egusa et al. | 451/52 |
| 5,702,294 A * | 12/1997 | Baltazar et al. | 451/541 |
| 5,873,956 A * | 2/1999 | Tanaka et al. | 148/318 |
| 5,878,496 A * | 3/1999 | Liu et al. | 29/898.066 |
| 6,325,867 B1 * | 12/2001 | Okita et al. | 148/318 |
| 6,502,486 B1 * | 1/2003 | Tenbrack et al. | 82/1.11 |
| 7,117,574 B2 * | 10/2006 | Liu et al. | 29/407.01 |
| 7,121,928 B2 * | 10/2006 | Takashima et al. | 451/49 |
| 7,664,565 B2 * | 2/2010 | Stammen | 700/175 |
| 8,534,923 B2 * | 9/2013 | Kubo et al. | 384/544 |
| 8,769,800 B2 * | 7/2014 | Ghibellini | 29/558 |
| 2002/0034926 A1 * | 3/2002 | Yasuie et al. | 451/47 |
| 2003/0171198 A1 * | 9/2003 | Bagusche | 492/58 |
| 2004/0123464 A1 * | 7/2004 | Nagano | 29/898.066 |
| 2006/0236545 A1 * | 10/2006 | Ficker et al. | 29/898.066 |
| 2008/0176488 A1 * | 7/2008 | Haneda et al. | 451/41 |
| 2009/0018694 A1 * | 1/2009 | Stammen | 700/175 |
| 2009/0199404 A1 * | 8/2009 | Tsukamoto et al. | 29/898.04 |
| 2009/0252447 A1 * | 10/2009 | Hirai et al. | 384/513 |
| 2009/0257700 A1 * | 10/2009 | Itoh | B21K 1/04 384/513 |
| 2013/0202240 A1 * | 8/2013 | Kikuchi | 384/571 |

FOREIGN PATENT DOCUMENTS

| | | | |
|---|---|---|---|
| JP | 06-246547 | | 9/1994 |
| JP | 10076448 A | * | 3/1998 ...... B24B 1/00 |
| JP | 2004-167668 | | 6/2004 |
| JP | 2006-009891 | | 1/2006 |
| JP | 2006-021605 | | 1/2006 |
| JP | 2009-191909 | | 8/2009 |
| JP | 2009-197899 | | 9/2009 |
| WO | WO 2005124174 A1 | * | 12/2005 |

OTHER PUBLICATIONS

English translation of JP 10076448 to Niigata, machine translation.*
International Preliminary Report on Patentability and Written Opinion of the International Searching Authority issued Jul. 19, 2012 in International (PCT) Application No. PCT/JP2010/070690.
International Search Report issued Feb. 1, 2011 in International (PCT) Application No. PCT/JP2010/070690.
Japanese Office Action issued Jan. 21, 2014 in corresponding Japanese Patent Application No. 2009-274360 with partial English translation.

* cited by examiner

PROCESSING METHOD AND BEARING

TECHNICAL FIELD

The present invention relates to a processing method of processing a component of, for example, a deep groove ball bearing, an angular contact ball bearing, or a tapered roller bearing, and relates to a bearing using the component processed by the processing method.

BACKGROUND ART

As a method of manufacturing a bearing ring (inner race or outer race) of a bearing, cutting and grinding are carried out as described in Patent Literature 1. For example, in a method of manufacturing (processing) the outer race, processes illustrated in FIG. 4 are sequentially carried out.

First, as illustrated in FIG. 4A, an outer race blank W1 that is processed into an almost finished shape of an outer race is obtained by forging such as cold rolling. The blank W1 is quenched in a heating furnace 52 to be subjected to surface hardening as illustrated in FIG. 4B, and then width grinding illustrated in FIG. 4C and outer diameter grinding illustrated in FIG. 4D are carried out on the blank W1. Next, the blank W1 subjected to the outer diameter grinding is turned, and then as illustrated in FIG. 4E, a rolling surface 51a and seal grooves 51b are processed into desired shapes. Finally, as illustrated in FIG. 4F, the rolling surface 51a is superfinished using a grindstone 53. Thus, the blank W1 is completed as an outer race 51.

The same processes are carried out also in a case of manufacturing (processing) the inner race. That is, an inner race blank that is processed into an almost finished shape of an inner race is obtained by forging such as cold rolling. The blank is quenched in a heating furnace to be subjected to surface hardening, and then width grinding is carried out on the blank. Next, the blank subjected to the width grinding is turned, and then a rolling surface and seal grooves of the blank are processed into desired shapes. Inner diameter grinding is performed on the blank thus cut, and superfinishing is performed on the rolling surface of the blank using a grindstone. Thus, the inner race blank is completed as an inner race.

CITATION LIST

Patent Literature 1: JP 06-246546 A

SUMMARY OF INVENTION

Technical Problems

That is, the method illustrated in FIG. 4 has the following lead time after heat treatment: heat treatment→width grinding→cutting→grinding. This is because, when a bearing to be manufactured has a large size (has an inner diameter dimension of 180 mm or more), the bearing is significantly deformed after the heat treatment, and thus requires a large finishing allowance.

Accordingly, the above-mentioned method has a lot of processing processes, which leads to an increased working time period. Further, after the cutting, chucking of a workpiece is temporarily released, and re-chucking is carried out for grinding. Thus, in a case of carrying out the re-chucking after temporarily releasing the chucking, it is necessary to perform an alignment work again, which causes a problem in workability. Accordingly, the workpiece may sometimes be misaligned, and hence in order to absorb this misalignment, it is necessary to prepare an extra machining allowance for grinding.

Further, in a case where it is necessary to remove a large machining allowance when grinding, processing is performed using a rough grindstone with good efficiency. However, when the processing is performed using the rough grindstone, a required surface property is not obtained, and it is necessary to carry out super finishing (mirror grinding) on the rolling surface.

In addition, at the time of cutting, a damaged layer having a thickness of several tens of micrometers, which is called a whiter layer or a heat-affected layer, is generated on the workpiece, and hence it is impossible to finish a region for receiving high stress, such as a rolling surface of a bearing.

Therefore, in view of the above-mentioned circumstances, the present invention provides a processing method capable of shortening a lead time without the need for carrying out super finishing (mirror grinding), and provides a bearing manufactured using the processing method.

Solution to Problems

A processing method of the present invention is a processing method of carrying out finishing of a component of a bearing while chucking the component by a chucking device, the processing method comprising carrying out hardened steel cutting and grinding while chucking the component without releasing the chucking by the chucking device. The hardened steel cutting merely means cutting. Cutting is normally carried out on a raw material. Accordingly, in order to define that the cutting of the present invention is cutting performed after heat treatment (after quenching), the cutting of the present invention is referred to as hardened steel cutting.

According to the processing method of the present invention, the hardened steel cutting and the grinding are carried out while chucking the component. Therefore, between the hardened steel cutting and the grinding, it is unnecessary to attach and detach a workpiece (component). Thus, it is unnecessary to perform an alignment work when re-chucking. Hence, an occurrence of misalignment can be prevented, and a machining allowance for grinding can be made small.

It is preferred that the component comprise a rolling surface, and finish grinding of the rolling surface and cutting of other regions except the rolling surface be carried out simultaneously. In this case, the cutting (hardened steel cutting) may be performed in a state in which a machining allowance of 100 μm or less remains on a single-sided surface of the component as a finish grinding allowance of the rolling surface.

The component may comprise an inner race having an outer surface on which the rolling surface is formed, and the component may comprise an outer race having an inner surface on which the rolling surface is formed.

A first bearing of the present invention uses the inner race processed by the above-mentioned processing method. Further, a second bearing of the present invention uses the outer race processed by the above-mentioned processing method.

Advantageous Effects of Invention

According to the processing method of the present invention, the machining allowance can be made small, and a grinding stone can be selected while placing more emphasis on accuracy than on efficiency. As a result, it is possible to obtain a surface property required as a product, and to omit super finishing (mirror grinding) of the rolling surface and the like. Thus, it is possible to shorten a lead time, and to improve productivity. In particular, according to the present invention, the machining allowance can be made small, and hence the processing method of the present invention is preferred for components of a large-sized bearing that is greatly deformed after the heat treatment (for example, bearing having an inner diameter dimension of 180 mm or more). Further, the hardened steel cutting is performed as dry cutting, and hence a grinding coolant is not needed. Accordingly, the hardened steel cutting is eco-friendly, and in addition, has an advantage that a workpiece can be finished with high dimensional accuracy.

The finish grinding of the rolling surface and the cutting of other regions except the rolling surface are carried out simultaneously, and thus more efficient processing can be carried out. Further, the cutting (hardened steel cutting) is performed in a state in which the machining allowance of 100 μm or less remains on the single-sided surface of the component as the finish grinding allowance of the rolling surface, and thus a damaged layer does not remain in a product. As a result, it is possible to provide a high-quality product.

According to the above-mentioned processing method, each component can be formed by processing performed for a shortened lead time. When assembling a bearing using the component thus formed, it is possible to improve productivity.

DETAILED DESCRIPTION OF THE INVENTION

Hereinafter, an embodiment of the present invention is described with reference to FIGS. 1 to 3.

Figure 3:
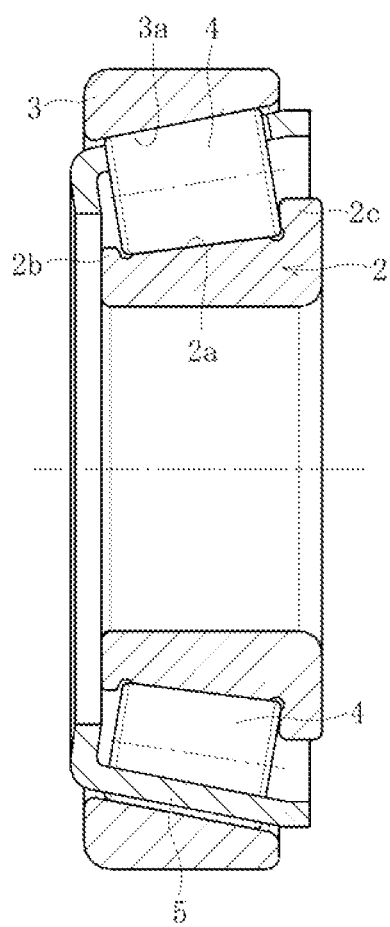
FIG. 3 A cross-sectional view illustrating the bearing to be processed by the processing method according to the present invention.
Figure 4A:
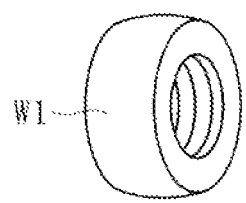
FIG. 4A A view illustrating outer race blank processing of a conventional method of processing an outer race of a bearing.
Figure 4B:
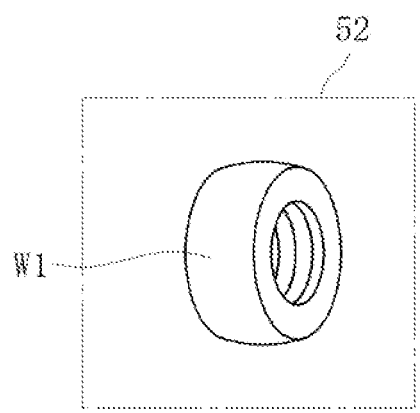
FIG. 4B A view illustrating surface finishing of the conventional method of processing an outer race of a bearing.
Figure 4C:
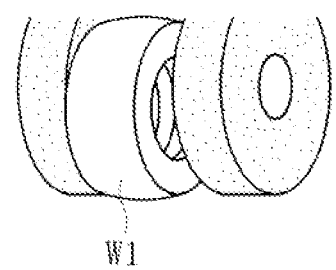
FIG. 4C A view illustrating width grinding of the conventional method of processing an outer race of a bearing.
Figure 4D:
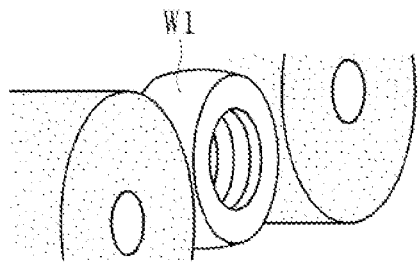
FIG. 4D A view illustrating outer diameter grinding of the conventional method of processing an outer race of a bearing.
Figure 4E:
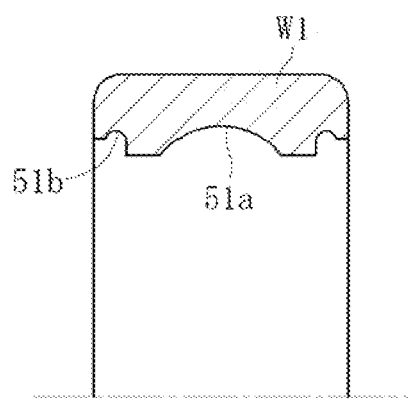
FIG. 4E A view illustrating profiling of the conventional method of processing an outer race of a bearing.
Figure 4F:
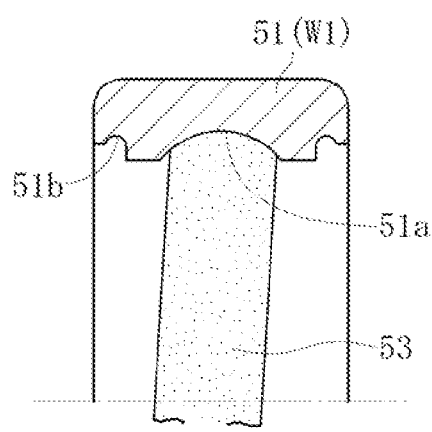
FIG. 4F A view illustrating finishing of the conventional method of processing an outer race of a bearing.

FIG. 3 illustrates a cross-sectional view of a bearing (tapered roller bearing) using components processed by a processing method according to the present invention. The bearing comprises: an inner race 2 having an outer surface on which a conical rolling surface 2a is formed; an outer race 3 having an inner surface on which a conical rolling surface 3a is formed; tapered rollers 4 interposed between the rolling surface 2a of the inner race 2 and the rolling surface 3a of the outer race 3; and a retainer 5 for retaining the tapered rollers 4. The inner race 2 comprises a small collar portion 2b on a small diameter side of the rolling surface 2a, and a large collar portion 2c on a large diameter side of the rolling surface 2a. Note that, components to be processed by the processing method of the present invention comprise the inner race 2 and the outer race 3.

Regarding the processing method according to the present invention, a case of the inner race 2 is first described. According to the processing method, heating treatment is carried out on an inner race forming blank (blank that is almost finished into a product shape) 2A (see FIG. 1). As the heating treatment, for example, quenching can be performed in a heating furnace. Then, width grinding is carried out, and as illustrated in FIG. 1, cutting and grinding are carried out. The inner race forming blank 2A has an outer surface on which a conical rolling surface forming surface 2Aa is formed, and comprises a small collar portion 2Ab on a small diameter side of the rolling surface forming surface 2Aa, and a large collar portion 2Ac on a large diameter side of the rolling surface forming surface 2Aa.

The cutting and the grinding are carried out while chucking the blank 2A, which forms the inner race 2 as the component, without releasing chucking by a chucking device 10. The chucking device 10 can be formed of, for example, a magnetic chuck.

The cutting is carried out using a cutting tool 11, and the grinding is carried out using a grinding tool 12. Using the cutting tool 11, hardened steel cutting is carried out. Accordingly, the cutting tool 11 comprises a cutter 15 capable of performing the hardened steel cutting. The cutter 15 capable of performing the hardened steel cutting can be formed of, for example, a sintered tool that is obtained by adding a special ceramic binder to Cubic Boron Nitride (CBN). The cutter 15 described above is commercially available. The cutter 15 is supported by a support 14, and can be moved by a moving mechanism (not shown) in at least an arrow "A" direction and an arrow "B" direction that are parallel to an axial center of the inner race 2. Herein, the hardened steel cutting merely means cutting. Cutting is normally carried out on a raw material. Accordingly, in order to define that the cutting of the present invention is cutting performed after heat treatment (after quenching), the cutting of the present invention is referred to as hardened steel cutting.

The grinding tool 12 comprises a disk-like grindstone 16, and a driving mechanism 17 for rotating the grindstone 16 about an axial center of the grinding tool 12. The driving mechanism 17 comprises, for example, a driving motor 18, and a transmission shaft 19 for transmitting a rotational driving force of the driving motor 18 to the grindstone 16. The axial center of the grinding tool 12 is inclined in accordance with an inclination angle of the rolling surface 2a of the inner race 2. Further, the grinding tool 12 can be moved in such an inclined state in an arrow "C" direction and an arrow "D" direction.

The chucking device 10 comprises a base table 20 on which the inner race forming blank 2A is attracted, and can rotate and drive the base table 20. In this case, on the base table 20, an end surface 2Ad on a large thickness side of the inner race forming blank 2A is placed and fixed. Thus, the inner race forming blank 2A attracted on the base table 20 is driven so as to rotate about an axial center O of the base table 20. For example, the base table 20 is placed and fixed on an existing rotary table that is publicly known and used, and thus the base table 20 can be rotated about the axial center O thereof.

Figure 1:
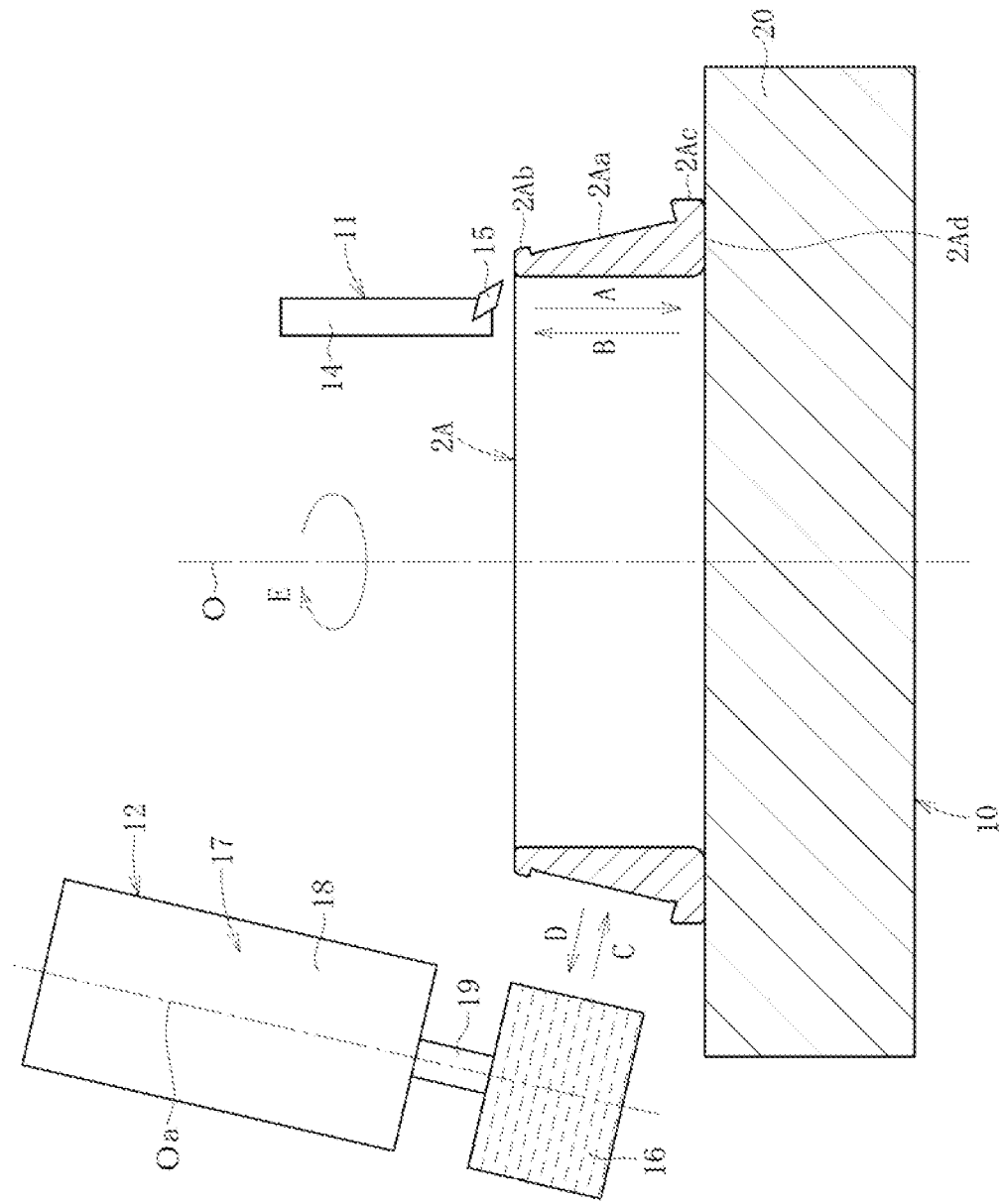
FIG. 1 A cross-sectional view illustrating an inner race of a bearing to be processed by a processing method according to the present invention.

Accordingly, while rotating the base table 20 about the axial center O thereof in an arrow "E" direction, as illustrated in FIG. 1, the cutter 15 of the cutting tool 11 is positioned on a radially inner side of the inner race forming blank 2A and on a side opposite to the base table, and then moved in the arrow "A" direction. In this way, it is possible to perform the cutting (hardened steel cutting) on the inner surface of the inner race forming blank 2A, and to finish the inner surface of the inner race 2. In this case, the cutting is performed in a state in which a machining allowance of 100 μm or less remains on a single-sided surface of the blank as a finish grinding allowance of the rolling surface 2a.

When carrying out this cutting, the grinding using the grinding tool 12 is carried out. At this time, as illustrated in FIG. 1, the grinding tool 12 is arranged on a radially outer side of the inner race forming blank 2A in a state in which an axial center Oa of the grinding tool 12 is inclined in accordance with an inclination angle of the rolling surface forming surface 2Aa. Further, in this state, while keeping the grinding tool 12 at this inclination angle, the grindstone 16 is rotated about the axial center Oa thereof and moved close to the inner race forming blank 2A in the arrow "C" direction, and then an outer peripheral surface of the grindstone 16 is brought into contact with the rolling surface forming surface 2Aa. In this way, it is possible to carry out the grinding on the rolling surface forming surface 2Aa, and to finish the rolling surface 2a of the inner race 2.

Next, a method of processing the outer race 3 is described. Also in this case, after forming an outer race forming blank (blank that is almost finished into a product shape) 3A, heating treatment is carried out on the blank 3A. As the heating treatment, for example, quenching can be performed in a heating furnace. Then, width grinding is carried out, and cutting (hardened steel cutting) and grinding are carried out. The outer race forming blank 3A has an inner surface on which a conical rolling surface forming surface 3Aa is formed. In the chucking device 10, a base table 30 comprises an annular support portion 30a on an outer peripheral portion of an upper surface of the base table 30. On the support portion 30a, an end surface 3Ab on a large thickness side of the outer race forming blank 3A is placed and fixed.

Figure 2:
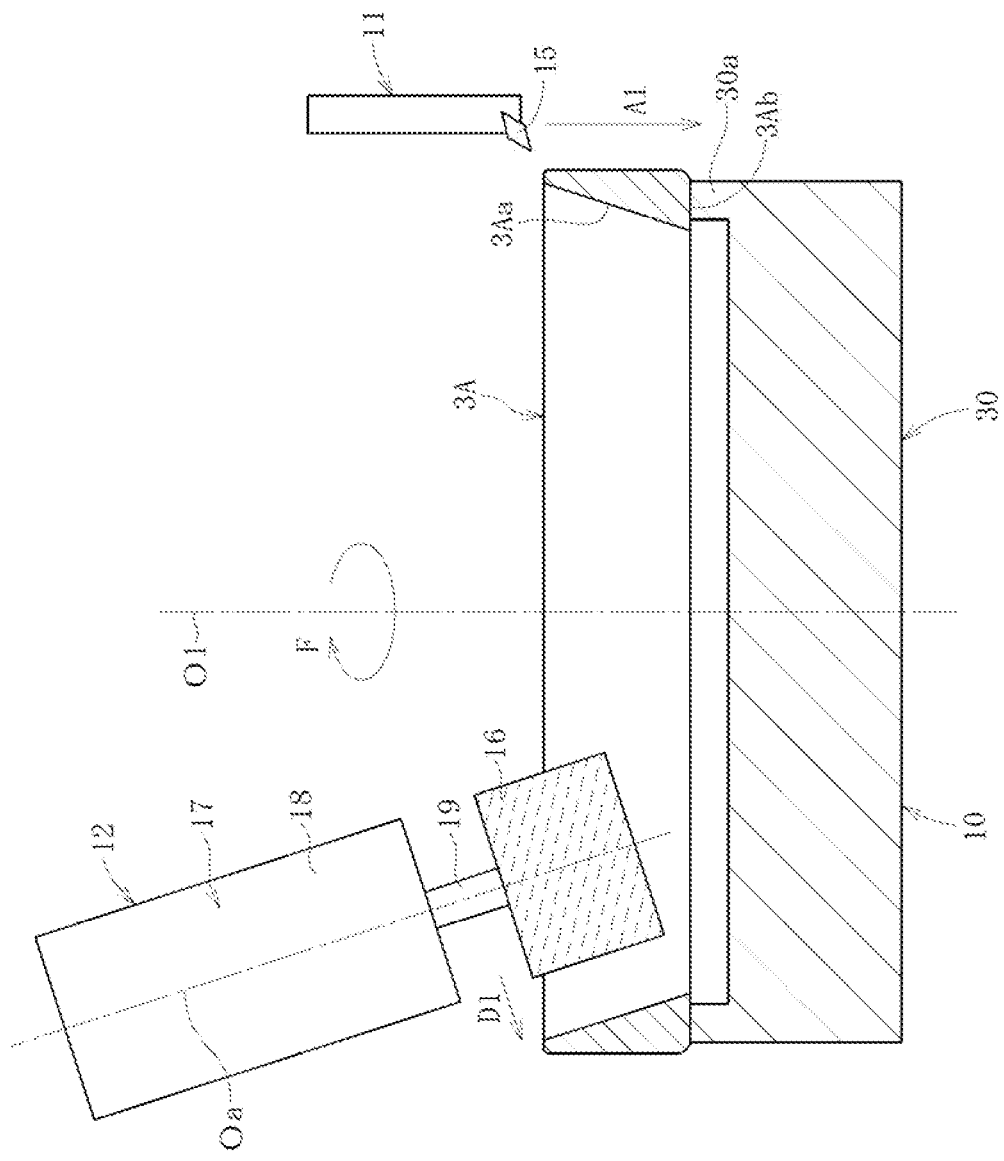
FIG. 2 A cross-sectional view illustrating an outer race of the bearing to be processed by the processing method according to the present invention.

Accordingly, while rotating the base table 30 about an axial center O1 thereof in an arrow "F" direction, as illustrated in FIG. 2, the cutter 15 of the cutting tool 11 is positioned on a radially outer side of the outer race forming blank 3A and on a side opposite to the base table, and then moved in an arrow "A1" direction. In this way, it is possible to perform the cutting (hardened steel cutting) on the outer surface of the outer race forming blank 3A, and to finish the outer surface of the outer race 3.

When carrying out this cutting, the grinding using the grinding tool 12 is carried out. At this time, as illustrated in FIG. 2, the grinding tool 12 is arranged on a radially inner side of the outer race forming blank 3A in a state in which the axial center Oa of the grinding tool 12 is inclined in accordance with an inclination angle of the rolling surface forming surface 3Aa. Further, in this state, while keeping the grinding tool 12 at this inclination angle, the grindstone 16 is rotated about the axial center Oa thereof and moved close to the inner surface of the outer race forming blank 3A in an arrow "D1" direction, and then the outer peripheral surface of the grindstone 16 is brought into contact with the rolling surface forming surface 3Aa. In this way, it is possible to carry out the grinding on the rolling surface forming surface 3Aa, and to finish the rolling surface 3a of the outer race 3. The cutting is performed in a state in which a machining allowance of 100 μm or less remains on a single-sided surface of the blank as a finish grinding allowance of the rolling surface 3a.

By the way, a grinding stone consists of three elements (abrasive grain, binder, and pore) and five factors (type of abrasive grains, grain size, grade, structure, and binder). Here, the three elements represent elements forming a grindstone, and the five factors represent properties of those elements. The abrasive grain means a highly hard granular or powdered substance exerting a function as a grindstone. The binder means a material functioning as a bonding material for bonding and retaining abrasive grains to one another, and is also referred to as a bond. The pore means a space present in a grinding stone, and has a function of storing chips.

Regarding the type of abrasive grains, JIS R6111-2002 (artificial abrasive) prescribes properties of general abrasive grains for industrial use, and the abrasive grains can be roughly classified into alumina-based abrasive grains and silicon carbide-based abrasive grains. In relation to a workpiece to be applied, the alumina-based abrasive grains are suitable for metals such as general steel and tool steel, and the silicon carbide-based abrasive grains are suitable for a nonferrous metal and a non-metal such as aluminum, copper, and cemented carbide. The grain size refers to a size of abrasive grains, and is expressed by a screen mesh number. When the grain size is expressed numerically, values equal to or smaller than 220 express coarse grains, and values larger than 220 express fine powders. The smaller numerical values express coarser grains, and coarser grains have lower strength. The grain size is selected depending on finishing accuracy of a surface to be ground. However, there is no relation between a finished surface roughness and the grain size, and the finished surface roughness varies depending on a dressing condition. The grade is represented by letters A to Z as an index indicating a retaining force between the abrasive grain and the binder. A letter closer to A represents a softer grade. In general, a soft grindstone is used for a hard workpiece, and a hard grindstone is used for a soft workpiece. Further, a grindstone having a higher grade has higher strength, and a grindstone having a softer grade has lower strength. The structure is expressed as an index determined based on a proportion of abrasive grains of a grindstone per unit volume (percentage of grain). Percentages of grain ranging from 62% to 34% are classified into fifteen classes that are numerically expressed by 0 to 14. When the percentage of grain is 62%, the structure is expressed as 0. The binder refers to a material for bonding abrasive grains to one another.

Accordingly, as the above-mentioned grindstone 16 of the grinding tool 12, various grindstones can be selected based on the above-mentioned three elements and five factors depending on a material and the like of the inner race 2 or the outer race 3 to be ground.

According to the processing method of the present invention, the hardened steel cutting and the grinding are carried out while chucking the component. Therefore, between the cutting (hardened steel cutting) and the grinding, it is unnecessary to attach and detach a workpiece (component). Thus, it is unnecessary to perform an alignment work when re-chucking. Hence, an occurrence of misalignment can be prevented, and the machining allowance for grinding can be made small. With this, the grinding stone can be selected while placing more emphasis on accuracy than on efficiency. As a result, it is possible to obtain a surface property required as a product, and to omit super finishing (mirror grinding) of the rolling surface and the like. Thus, it is possible to shorten a lead time, and to improve productivity. In particular, according to the present invention, the machining allowance can be made small, and hence the processing method of the present invention is preferred for components of a large-sized bearing that is greatly deformed after the heat treatment (for example, bearing having an inner diameter dimension of 180 mm or more). Further, the hardened steel cutting is performed as dry cutting, and hence a grinding coolant is not needed. Accordingly, the hardened steel cutting is eco-friendly, and in addition, has an advantage that a workpiece can be finished with high dimensional accuracy.

Finish grinding of the rolling surfaces 2a, 3a and cutting of other regions except the rolling surfaces 2a, 3a are carried out simultaneously, and thus more efficient processing can be carried out. Further, the cutting (hardened steel cutting) is performed in a state in which the machining allowance of 100 μm or less remains on the single-sided surface of the blank as the finish grinding allowance of the rolling surface 2a or the rolling surface 3a, and thus a damaged layer does not remain in a product. As a result, it is possible to provide a high-quality product.

According to the above-mentioned processing method, each component can be formed by processing performed for a shortened lead time. When assembling a bearing using the component thus formed, it is possible to improve productivity.

By the way, the above-mentioned embodiment exemplifies the tapered roller bearing as a bearing, but another bearing such as a deep groove ball bearing or an angular contact ball bearing may be employed. Here, regarding the deep groove ball bearing, a raceway groove formed in an inner race or an outer race has a circular arc cross-section that is slightly larger in radius than a rolling ball. It is possible to apply a radial load as well as axial loads in both directions. The deep groove ball bearing has a low friction torque, and is suitable for parts rotating at high speed and applications requiring low noise and low vibration. The angular contact ball bearing is a bearing in which a ball is held in contact with a raceway of an inner race or a raceway of an outer race at some angle in a radial direction. The application of the axial load is limited in one direction, but the angular contact ball bearing is suitable for receiving a combined load of the axial load and the radial load. This bearing has a contact angle, and hence an axial component force is generated when the radial load acts. Accordingly, the angular contact ball bearing can be used in opposed arrangement of two bearings or in combination of multiple bearings. In a case of mounting two bearings adjacently, there are obtained matched angular contact ball bearings that are set through adjusting a clearance previously. Note that, regarding the tapered roller bearing, a tapered roller and a bearing ring are held in line-contact with each other, and a design is made so that an inner race rolling surface, an outer race rolling surface, and a cone vertex of the roller coincide with one point on a rotation center line of the bearing. Thus, the roller receives a resultant force from the inner race rolling surface and the outer race rolling surface to roll on the rolling surfaces while being pressed against and guided by a cone back face rib of the inner race. Further, it is possible to apply the radial load and the axial load in one direction. As the contact angle becomes larger, a load capacity for the axial load is increased. Even in a case of receiving a pure radial load, the axial component force is generated, and hence the tapered roller bearing is normally used in opposed arrangement of two bearings.

The embodiment of the present invention is described above, but the present invention is not limited to the above-mentioned embodiment and various modifications can be made thereto. For example, as the heat treatment performed before the cutting and the grinding, various methods such as carburizing and quenching, and immersion quenching can be used depending on a material and the like of the blank. Further, various changes can be made in rotational speed at the time of the cutting and the grinding of the inner race forming blank 2A or the outer race forming blank 3A, moving speed of the cutter 15 at the time of the cutting using the cutting tool 11, rotational speed of the grindstone 16 of the grinding tool 12, and the like. Further, as the chucking device 10, any device may be employed as long as the device can chuck a workpiece (component) to be processed and can perform the hardened steel cutting and the grinding while keeping this chucking state. Thus, the chucking device 10 is not limited to the magnetic chuck, and it is possible to use another existing device that is publicly known and used.

In the above-mentioned processing processes illustrated in FIGS. 1 and 2, the component is exemplified as a component of the tapered roller bearing, but in a case where the component is a rolling bearing as illustrated in FIG. 4, the cutting tool 11 or the grinding tool 12 has a different configuration, moving direction, and the like. However, in this case, it is possible to use the cutting tool 11 or the grinding tool 12 having an existing configuration, moving mechanism, and the like that are publicly known and used.

INDUSTRIAL APPLICABILITY

It is possible to carry out super finishing (mirror grinding). Apart to be processed by the processing method comprises an inner race and an outer race of a deep groove ball bearing, an angular contact ball bearing, a tapered roller bearing, or the like. As the chucking device for holding a workpiece (component) at the time of cutting and grinding, there can be used a magnetic chuck for attracting and fixing a magnetic material by magnetism. Examples of the magnetic chuck include a type using a permanent magnet, a type using an electromagnet, and a hybrid type using both a permanent magnet and an electromagnet.

REFERENCE SIGNS LIST 2 inner race
2a rolling surface
3 outer race
3a rolling surface
10 chucking device

The invention claimed is:
1. A processing method for finishing an inner race of a bearing, the processing method comprising:
  hardened steel cutting a hardened rolling surface of an outer surface of the inner race, in a state where the hardened rolling surface of the outer surface of the inner race has a machining allowance of 100 μm or less remaining as a finish grinding allowance, while chucking the inner race by a chucking device;
  finish grinding the hardened rolling surface of the inner race, while chucking the inner race by the chucking device, the finish grinding removing a damage layer generated by the hardened steel cutting of the hardened rolling surface; and hardened steel cutting on an inner surface of the inner race, which is a portion excluding the hardened rolling surface, wherein the hardened steel cutting on the inner surface and the finish grinding of the hardened rolling surface occur simultaneously without releasing the chucking of the inner race by the chucking device, so that a damaged layer generated by the hardened steel cutting the of the hardened rolling surface is removed by the finish grinding.

2. A processing method for finishing an outer race of a bearing, the processing method comprising:

hardened steel cutting a hardened rolling surface of an inner surface of the outer race, in a state where the hardened rolling surface of the outer surface of the inner race has a machining allowance of 100 µm or less remaining as a finish grinding allowance, while chucking the inner race by a chucking device;

finish grinding the hardened rolling surface of the outer race, while chucking the outer race by the chucking device, the finish grinding removing a damage layer generated by the hardened steel cutting of the hardened rolling surface; and hardened steel cutting on an outer surface of the outer race, which is a portion excluding the hardened rolling surface, wherein the hardened steel cutting on the outer surface and the finish grinding of the hardened rolling surface occur simultaneously without releasing the chucking of the outer race by the chucking device, so that a damaged layer generated by the hardened steel cutting the of the hardened rolling surface is removed by the finish grinding.

* * * * *